US00RE35592E

United States Patent [19]

Wakabayashi et al.

[11] E Patent Number: Re. 35,592

[45] Reissued Date of Patent: Aug. 19, 1997

[54] CAMERA WITH SELF-TIMER

[75] Inventors: Hiroshi Wakabayashi, Yokohama; Kazuyuki Kazami; Toshiyuki Nakamura, both of Tokyo; Daiki Tsukahara, Kawasaki, all of Japan

[73] Assignee: Nikon Corporation, Tokyo, Japan

[21] Appl. No.: 213,565

[22] Filed: Mar. 16, 1994

Related U.S. Patent Documents

Reissue of:

[64] Patent No.: 5,097,285
Issued: Mar. 17, 1992
Appl. No.: 617,266
Filed: Nov. 21, 1990

U.S. Applications:

[63] Continuation of Ser. No. 474,313, Feb. 2, 1990, abandoned, which is a continuation of Ser. No. 199,142, May 26, 1988, abandoned.

[30] Foreign Application Priority Data

| | | | |
|---|---|---|---|
| Jun. 3, 1987 | [JP] | Japan | 62-86562 |
| Jul. 24, 1987 | [JP] | Japan | 62-113572 |
| Feb. 1, 1988 | [JP] | Japan | 63-12364 |

[51] Int. Cl.[6] ..... G03B 17/18

[52] U.S. Cl. ..... 396/264; 396/286

[58] Field of Search ..... 354/237, 238.1, 354/239, 267.1, 412, 418, 471–475

[56] References Cited

U.S. PATENT DOCUMENTS

| | | | |
|---|---|---|---|
| 4,515,453 | 5/1985 | Wakabayashi et al. | 396/62 |
| 4,710,008 | 12/1987 | Tosaka et al. | 396/299 |
| 4,812,870 | 3/1989 | Kawamura | 396/222 |

FOREIGN PATENT DOCUMENTS 55-77731 6/1980 Japan .

*Primary Examiner*—David M. Gray
*Attorney, Agent, or Firm*—Shapiro and Shapiro

[57] ABSTRACT

A camera has an exposure device for effecting a photographing operation on a film in response to manipulation of a member, and a self-timer for causing the exposure device to effect the photographing operation after the counting of a predetermined time. The self-timer has a first state for causing the exposure device to effect the photographing operation only once and a second state for causing the exposure device to effect the photographing operation plural times. The camera comprises a first display for indicating that the self-timer is in an operable state, a second display for indicating that the exposure device functions plural times in response to the manipulation of the number, independently of the self-timer, and a control device for controlling the first and second display. The control device is adapted to only activate the first display in the first state of the self-timer and to activate both the first and second displays in the second state of the self-timer.

7 Claims, 11 Drawing Sheets

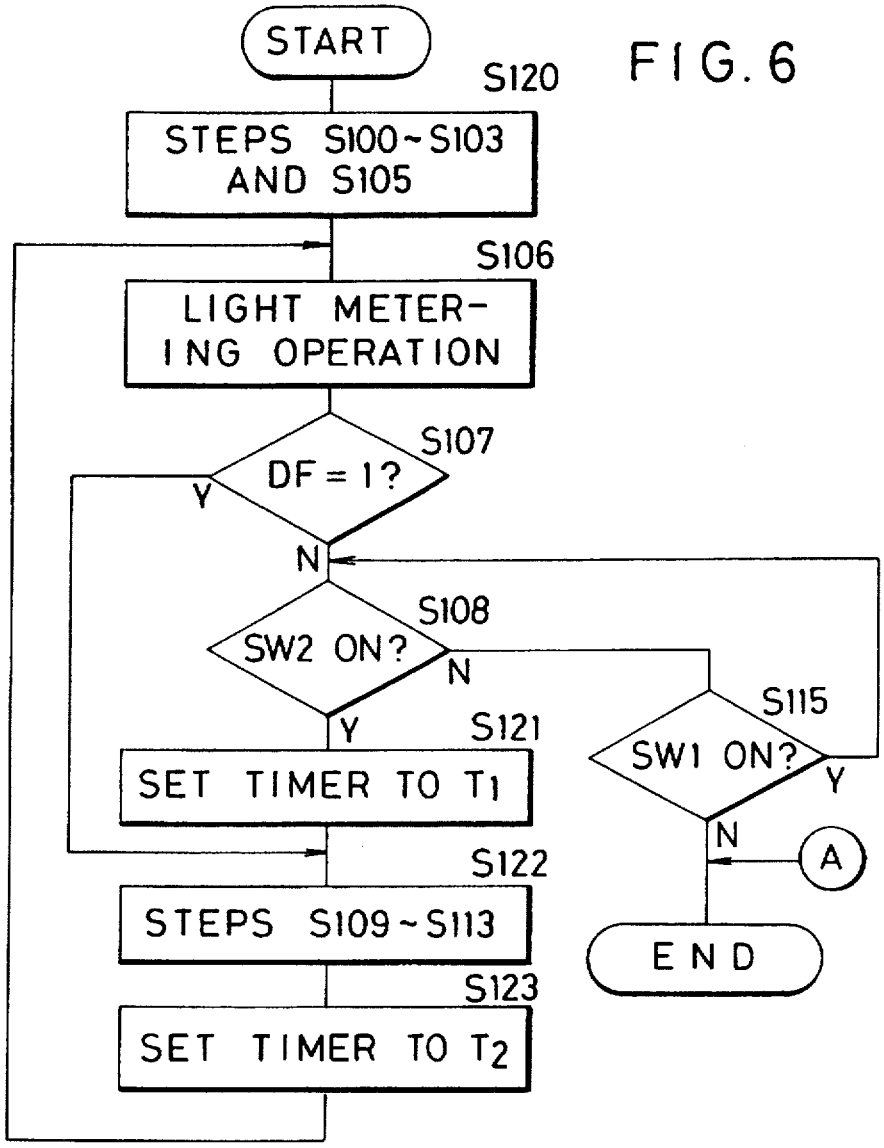
FIG. 6
FIG. 7A
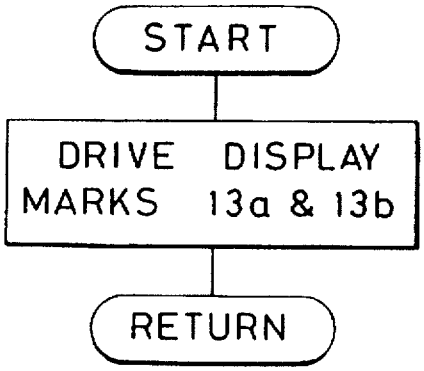
FIG. 7B
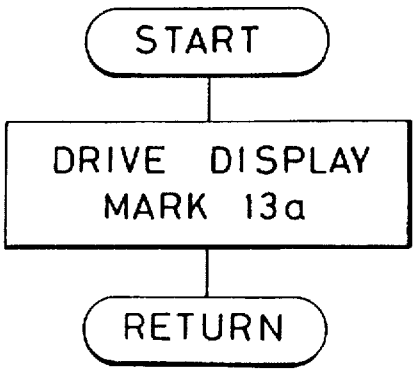

CAMERA WITH SELF-TIMER

Matter enclosed in heavy brackets [ ] appears in the original patent but forms no part of this reissue specification; matter printed in italics indicates the additions made by reissue.

This is a continuation of application Ser. No. 474,313 filed Feb. 2, 1990, now abandoned, which is a continuation of application Ser No. 199,142 filed May 26, 1988, both of which are now abandoned.

BACKGROUND OF THE INVENTION

1. Field of the Invention

The present invention relates to a camera incorporating a self-timer.

2. Related Background Art

A camera capable of photographing plural frames in continuous manner a the self-timer photographing operation is disclosed in a Japanese Laid-Open Patent No. 55-77731.

In recent years, particularly in the field of cameras with a lens shutter, there have been made available those equipped with a self-timer and capable of a function of flash photographing and a function of switching the focal length of a photographing lens, but such functions have not been linked with the self-timer.

SUMMARY OF THE INVENTION

The object of a the present invention is to provide a camera incorporating a self-timer, with improved operability.

BRIEF DESCRIPTION OF THE DRAWINGS

FIG. 6 is a flow chart showing the function of an improvement of the first embodiment of the present invention;

FIGS. 7A and 7B are flow charts showing a part of the function of the first embodiment of the present invention;

DESCRIPTION OF THE PREFERRED EMBODIMENTS

Figure 1:
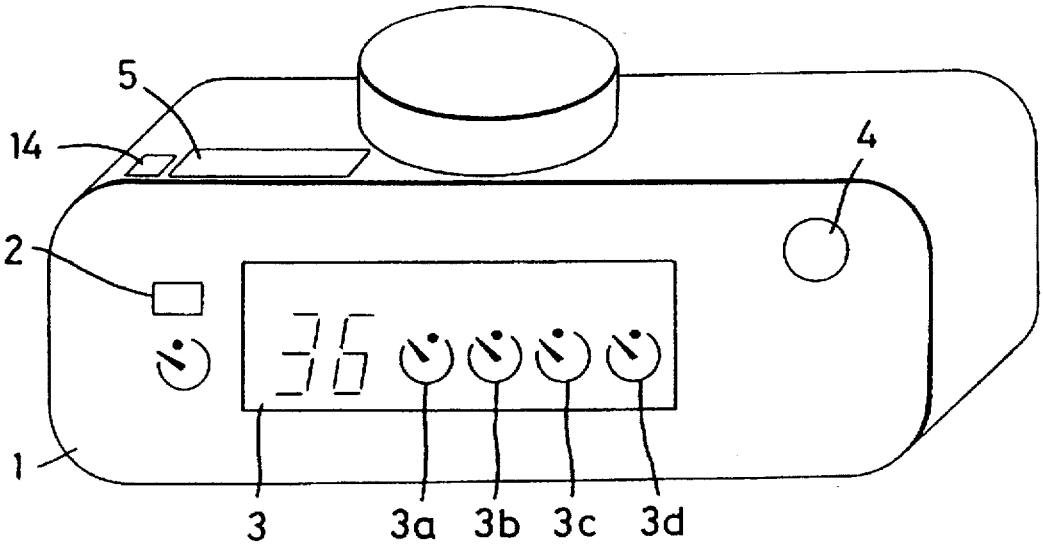
FIG. 1 is a perspective view of a camera body embodying the present invention.

Referring to FIG. 1, a camera body 1 is provided, on the upper face thereof, with a self-timer button 2 at the left side portion and a liquid crystal display unit 3 at the central portion.

The self-timer button 2 is used for setting a self-timer mode, and the self-timer photographing is started by depressing a shutter release button 4 provided at the right side portion in the upper face of the camera body 1, when the self-timer mode is set. In the self-timer mode there is a single self-timer mode for photographing one frame only, after a predetermined time, and a multiple self-timer mode for photographing plural frames at predetermined intervals.

The liquid crystal display unit 3 informs the operator of information necessary for photographing, such as the readiness of self-timer photographing, set mode of flash photographing, number of advanced film frames, etc. A flash emitting unit 5 constitutes a part of the electronic flash unit.

FIG: 2 is a block diagram of a self-timer unit in a first embodiment.

Figure 2:
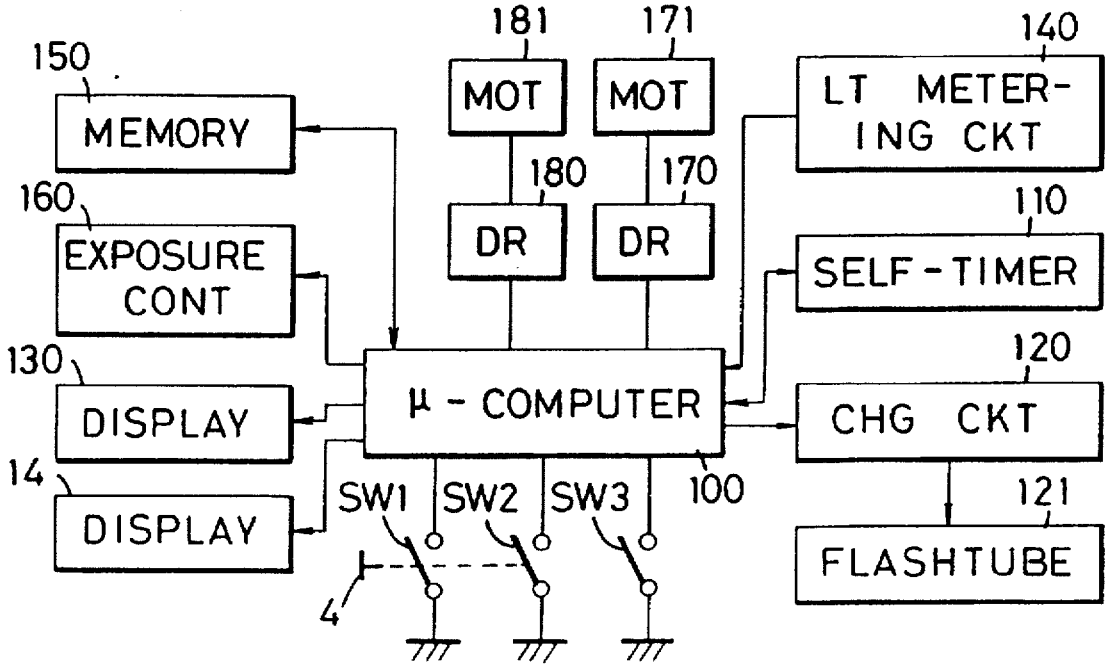
FIG. 2 is a block diagram of a part of the present invention.

Referring to FIG. 2, a microcomputer 100 incorporates a CPU, a memory, input/output ports and a timer circuit. The input/output ports of the microcomputer 100 are connected to the input/output terminals of a self-timer 110 and a memory 150, and the output ports are respectively connected to the input terminals of a charging circuit 120 of the electronic flash unit, a light metering circuit 140, an exposure control circuit 160, a display unit 130, a driving circuit 170 for a motor 171, a driving circuit 180 for a motor 181, and a display unit 14. The display unit 14 indicates the state of time counting of the self-timer. The motor 171 regulates the optical characteristics of a photographing optical system such as switching of focal length or attach/detaching of a filter, while the motor 181 advances the photographic film. The charging circuit 120 is used for charging an incorporated main capacitor for causing light emission from a flash tube 121.

An explanation of each of a plurality of switches is given below:

There are provided a switch SW1 to be closed at the first stroke of the shutter release button 4; a switch SW2 to be closed at the second stroke thereof, and a self-timer button switch SW3 to be closed when the self-timer button is depressed.

The microcomputer 100 converts each depression of the self-timer button 2 into a pulse signal, and supplies the memory 150 with the number of pulse signals.

The exposure control circuit 160 is activated by a control signal from the microcomputer 100 responding to the actuation of the switch SW2.

The display unit 130 causes the liquid crystal display unit 3 to display information necessary for photographing, such as the readiness for self-timer photographing, the set mode of flash photographing, the number of advanced film frames, etc.

In the following there will be explained the function of the above-described camera. In the self-timer photographing, if the self-timer button 2 is depressed twice, the self-timer switch SW3 is closed twice, indicating continuous photographing of two frames with the self-timer, namely the multiple self-timer mode. When the self-timer switch SW3 is closed twice, the number "2" of depressions of the self-timer button 2 is stored in the memory 150. In response to the closing of the self-timer switch SW3, the microcomputer 100 controls the display unit 130, whereby the display unit 3 shows self-timer mode displays 3a, 3b indicating to the photographer the setting of the multiple self-timer mode. Then, when the shutter release button 4 is depressed, the shutter release button switch SW2 is closed, and, in response, the microcomputer 100 activates the exposure control circuit 160 after the lapse of a predetermined period $T_1$, thereby causing first shutter release. After the film is advanced by a frame, second shutter release is conducted after the lapse of a predetermined time $T_2$. If the self-timer button 2 is depressed three or four times, the self-timer switch SW3 is closed correspondingly three or four times whereby the liquid crystal display unit 3 shows self-timer mode displays 3c and 3d. The self-timer mode displays 3a–3d are erased one by one at each shutter release, but it is also possible to indicate the number of shutter releases by a numeral.

The above-mentioned periods $T_1$, $T_2$ may be selected mutually equal, but the former may be selected longer in consideration of the time required for the operator to move from the camera to the position to be photographed. The third and fourth shutter releases are conducted at intervals the same as the period $T_2$.

On the other hand, if the shutter release button 4 is depressed without the depression of the self-timer button 2, the shutter is released in an ordinary photographing operation. If the self-timer button 2 is depressed only once, there is set the single self-timer mode, in which only one frame is photographed after a predetermined time.

As explained in the foregoing, the multiple self-timer mode in which plural frames are photographed with the self-timer at predetermined intervals can be easily set by a single button, without other operating members. In this manner it is possible to achieve cost reduction and space saving, leading to the compactness of the camera.

Figure 3:
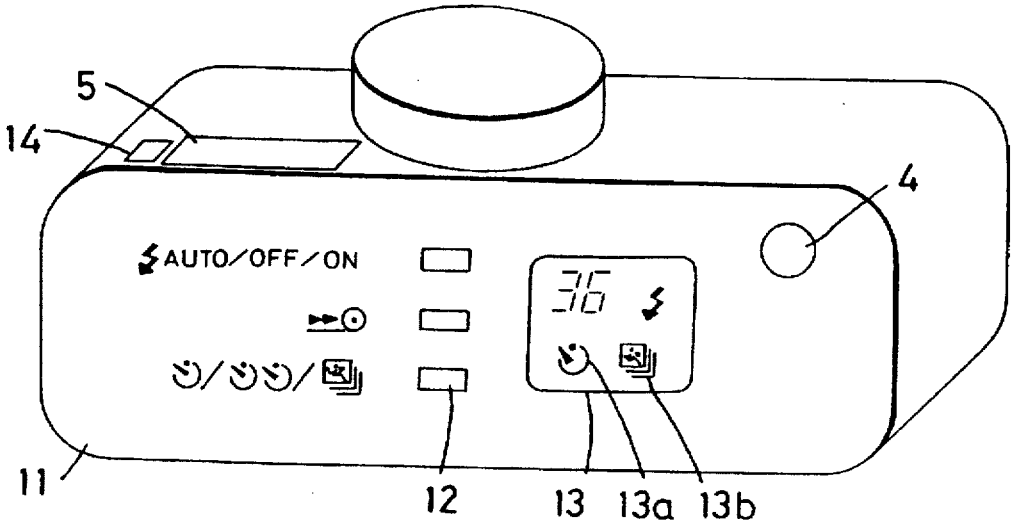
FIG. 3 is a perspective view of another camera body embodying the present invention.

Now reference is made to FIG. 3, for explaining an improvement of the first embodiment of the present invention.

In the foregoing embodiment the number of frames to be photographed with the self-timer is selected by the number of depressions of the self-timer button. In the present improvement, the ordinary photographing mode, continuous photographing mode, single self-timer mode and multiple self-timer mode are selected by the depressions of the self-timer button.

Referring to FIG. 3, a camera body 11 is provided with a self-timer button 12 in the central portion of the upper face, and a liquid crystal display unit 13 in the right side portion.

The function of the above-described camera is similar to that of the foregoing first embodiment, but, in the present improvement the ordinary photographing mode, single self-timer mode, multiple self-timer mode and continuous photographing mode are cyclically selected by the depressions of the self-timer button 12. In the ordinary photographing mode, the photographing operation is terminated after the photographing of a frame even if the shutter release button 4 continues to be depressed. In the continuous photographing mode, plural frames are photographed continuously while the shutter release button 4 is in the depressed state. The following table shows the liquid crystal displays given in these photographing modes.

TABLE

| Number of depressions | Photographing mode | Display: Self-timer display 13a | Display: Cont. display 13b |
|---|---|---|---|
| 1 (5) | Ordinary mode | OFF | OFF |
| 2 (6) | Self-timer mode | ON | OFF |
| 3 (7) | Multi self-timer mode | ON | ON |
| 4 (8) | Continuous mode | OFF | ON |

Thus, in the multiple self-timer mode, the displays for the self-timer mode and the continuous photographing mode are both turned on to indicate photographing of multiple frames with the self-timer. It is therefore possible to dispense with the display for the multiple self-timer mode, thus saving the display space and the cost therefor.

In the foregoing embodiments, the self-timer photographing operation is started by the depression of the shutter release button after the setting of the self-timer mode by the depression of the self-timer button, but, in certain cameras, the self-timer photographing operation is immediately started by the depression of the self-timer button. In such cameras the self-timer button can be, for example, composed of a two-step switch, of which the first and second strokes are respectively used for setting the number of frames and setting the self-timer mode. For self-timer photographing of one frame only, the button is depressed to the second stroke, but, for the self-timer photographing of plural frames, the button is repeatedly depressed to the first stroke to set the number of frames and is then depressed to the second stroke.

In the multiple self-timer mode of the present improvement, the first shutter release is conducted after the lapse of a predetermined time $T_1$ from the depression of the shutter release button after the setting of the self-timer mode, and the subsequent shutter releases are conducted with an interval of $T_2$ as explained before, but it is also possible to change various photographing conditions with these frames.

For example, in a so-called 2-focus camera in which the photographing lens is placed either in a telephoto (T) position or in a wide angle (W) position by a T/W selector button as disclosed in the U.S. Pat. No. 4,515,453, it is possible to photograph the first frame with either of said T- and W-positions and the second frame with the other.

In the following there will be explained the operation for setting such tele/wide (T/W) photographing mode, with reference to FIG. 4.

Figure 4:
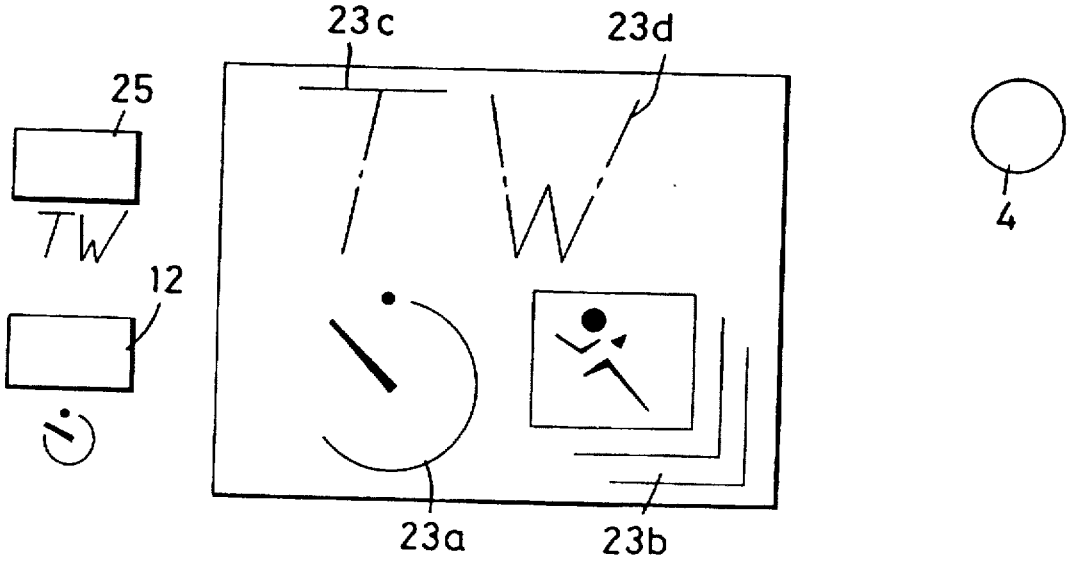
FIG. 4 is a view of a display unit of a camera embodying the present invention.

Referring to FIG. 4, the self-timer button 12 is at first depressed twice to select the multiple self-timer mode, whereby a self-timer mode display 23a and a continuous photographing mode display 23b are turned on, indicating to the photographer the multiple self-timer mode. Then a T/W selector button 25 is depressed whereby either of displays T (tele) and W (wide) indicating the focal length for the first frame is turned on while the other for the second frame flashes. For example, if the first frame and the second frame in the self-timer photographing are respectively taken with the telephoto (T) and wide (W) positions, the mark 23c for the telephoto position is turned on while the mark 23d for the wide angle position flashes. Then, in response to the depression of the shutter release button 4, the self-timer is activated as explained before, and the shutter is released with the telephoto position after the lapse of the predetermined time $T_1$. The second shutter release with the wide angle position is conducted after the lapse of the time $T_2$ from the completion of the first photographing. In the foregoing explanation the first frame is photographed with the telephoto position, but the photographing operation may naturally be started with the photographing in the wide angle position.

In the foregoing explanation the self-timer button 12 is depressed twice for selecting the multiple self-timer mode involving a change in the focal length, but it is advantageous that such multiple self-timer mode involving switch in the focal length can be selected by a depression of the self-timer button 12 followed by the depression of the T/W selector button 25. Also in the foregoing explanation the mark 23a for the self-timer mode and the mark 23b for the continuous photographing mode are both turned on, but the latter may be dispensed with since the multiple self-timer mode can be identified from the simultaneous turning-on and flashing of the telephoto mark 23c and wide angle mark 23d.

If a zoom lens is employed as the photographing lens, it is also possible to gradually vary the focal length each time by an amount corresponding to the number of frames to be photographed in the multiple self-timer mode. If a soft focus filter can be inserted into the photographing optical path, it is furthermore possible, for example, to photograph the first frame without the soft focus filter and the second frame with the soft focus filter. It is furthermore possible to gradually vary the amount of exposure, according to the number of depressions of the self-timer button 12.

Figure 5:
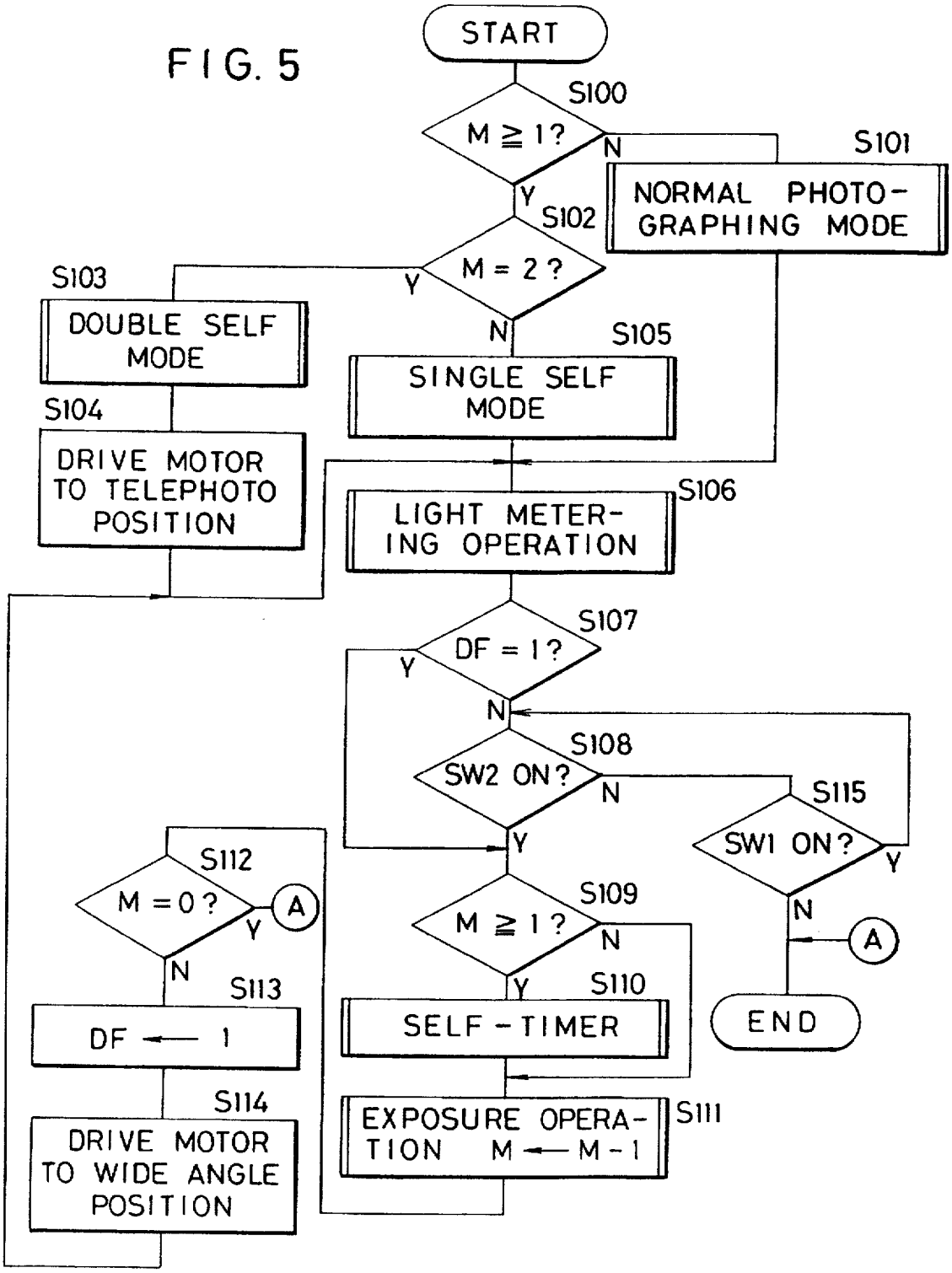
FIG. 5 is a flow chart showing the function of a first embodiment of the present invention.

Now reference is made to FIG. 5 for explaining the operation of an example of switching over the focal length of the photographing lens in the multiple self-timer mode.

The circuit is so constructed that a depression of the self-timer button selects self-timer photographing of one frame (single self-timer mode), while two depressions select self-timer photographing of two frames (double self-timer mode), and three depressions again select the single self-timer mode. Consequently, the number stored in the memory 150 by the microcomputer 100 is "2" at maximum. In the flow chart shown in FIG. 5, in case of the double self-timer mode, the focal length of the photographing lens is at the telephoto position for the first frame and at the wide angle position for the second frame. If the wide angle position is selected for the first frame, it will be cumbersome, at the start of the photographing operation with the double self-timer mode, to confirm whether a desired area of the object can be reliably photographed with the telephoto position in the second frame.

The flow chart shown in FIG. 5 is started when the switch SW1 is closed. A step S100 checks the contents M of the memory 150 to discriminate whether the self-timer photographing is selected. If M is equal to or larger than "1", indicating that the self-timer photographing is selected, the sequence proceeds to a step S102 for discriminating whether the contents M of the memory 150 is equal to "2". If so, the sequence proceeds to a step S103 for selecting the double self-timer mode, or, if not, it proceeds to a step S105 for selecting the single self-timer mode. In the double self timer mode, a step S104 causes the driving circuit 170 to activate the motor 171 for moving the lens to the telephoto position, and a step S107 conducts light metering. Then a step S107 discriminates the state of a double self-timer flag DF which is set to "1", in the double self-timer mode, in a step S113 after the photographing of the first frame. A step S108 discriminates whether the switch SW2 is closed, and, if not, the sequence proceeds to a step S115 and is terminated if the switch SW1 is open. A step. S1O9 discriminates a normal photographing mode or a self-timer photographing mode. A step S110 activates the self-timer 110 and, after the measurement of a predetermined time by the self-timer 110, the sequence proceeds to a step S111 which executes exposure control, decreases the contents M of the memory 150 by one, and causes the driving circuit 180 to activate the motor 181 for advancing the photographic film by one frame. A step S112 discriminates whether the contents M of the memory 150 is zero, and, if so, the sequence is terminated. If not, the sequence proceeds to the step S113, and a step S114 causes the driving circuit 170 to activate the motor 171 for moving the lens to the wide angle side.

FIG. 6 shows a flow chart in which, in the double self-timer mode, the focal length of the lens is not changed, and the self-timer time $T_2$ for the second frame is selected shorter than the self-timer time $T_1$ for the first frame. In FIG. 6, the steps S104 and S114 in FIG. 5 are deleted, and there are added a step S121 for setting a self-timer time $T_1$ and a step S123 for setting a self-timer time $T_2$.

As shown in FIG. 7A, a step S103 displays the marks 13a and 13b simultaneously, and, as shown in FIG. 7B, a step S105 displays the mark 13a only.

In the following there will be explained, with reference to FIG. 8, the operation of a second embodiment of the present invention, in which the single self-timer mode or the double self-timer mode is selected in flash photographing operation.

Steps S120 and S106 are the same as those shown in FIG. 6. A step S130 discriminates whether a flash photographing operation (flash mode) is selected. More specifically, the microcomputer 100 discriminates whether a flash photographing operation is to be made, based on the output of the light metering circuit 140. If the flash mode is selected, a step S131 causes the charging circuit 120 to initiate charging of a main capacitor in the electronic flash unit. A step S132 discriminates the completion of charging, and, if completed, the sequence proceeds to a step S136 for executing the operations of the steps S107–S113 and S115 shown in FIG. 5. The step S114 in FIG. 5 is excluded. If the step S132 identifies that the charging of the main capacitor is not complete, the sequence proceeds to a step S133 for discriminating the state of the flag DF. If the first frame is already photographed in the double self-timer mode, the flag DF is "1" so that the sequence proceeds to the step S132. If not, the sequence proceeds to a step S134 for prohibiting the exposure operation and giving a visual or sound alarm, and a step S135 discriminates whether the switch SW1 is closed or not.

Figure 9:
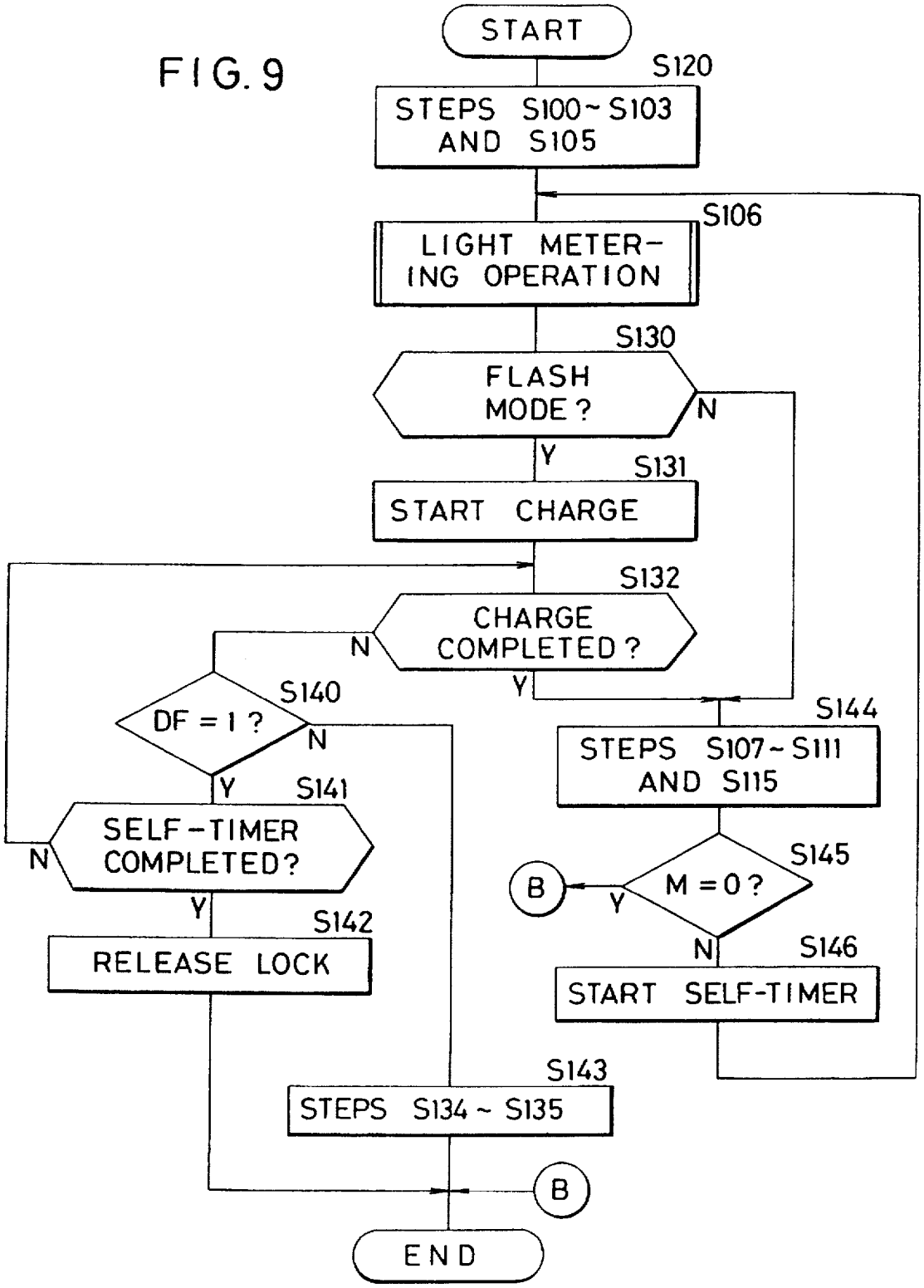
FIG. 9 is a flow chart showing the function of an improvement of the second embodiment of the present invention.

In the foregoing explanation, when the double self-timer mode is selected, the self-timer is started after the photographing of the first frame and after the completion of charging of the flash unit. However, it is also possible to activate the self-timer in a parallel manner to the charging of the flash unit. Such structure will be explained with reference to FIG. 9, as an improvement of the second embodiment.

Figure 8:
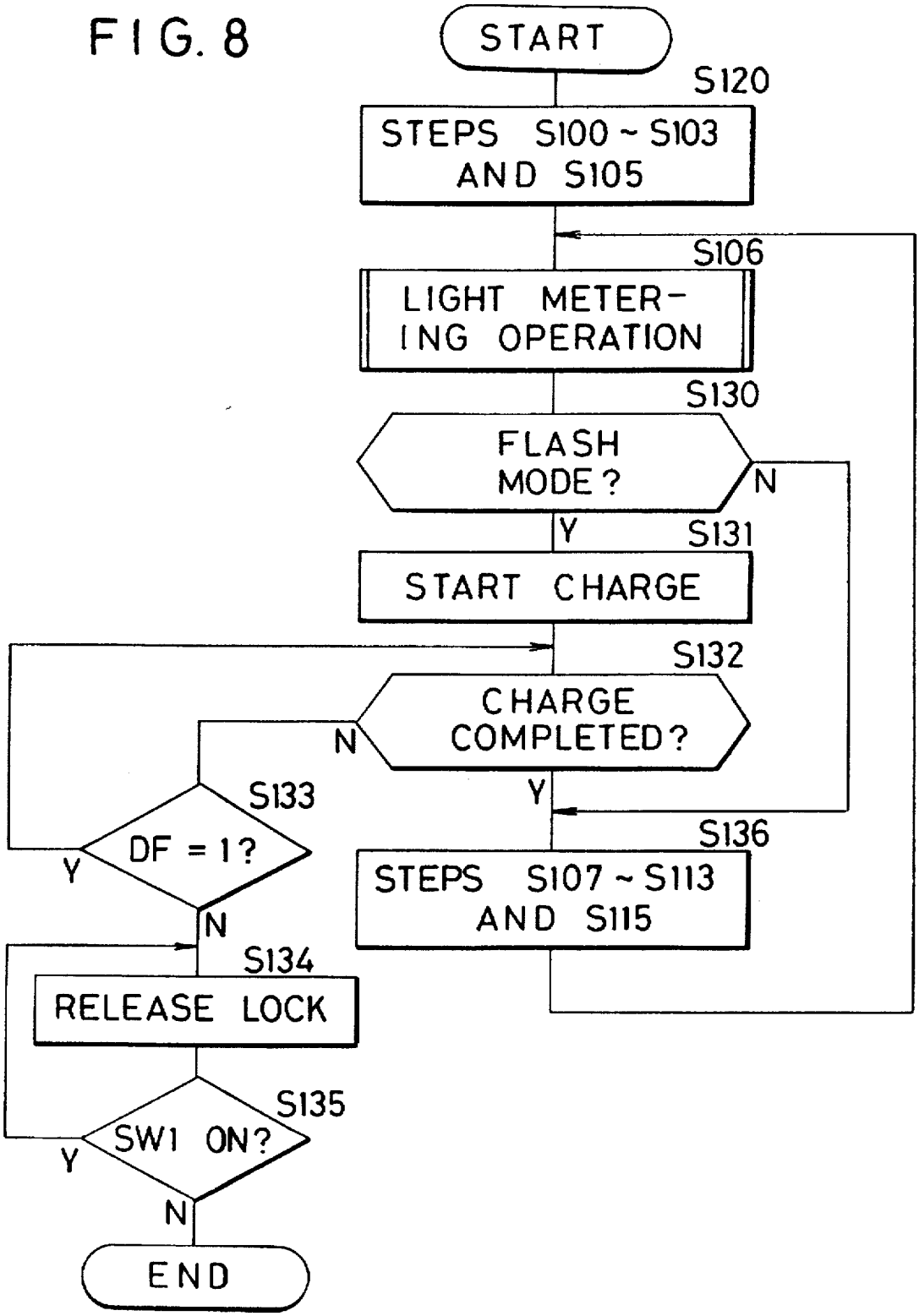
FIG. 8 is a flow chart showing the function of a second embodiment of the present invention.

Steps S120, S106 and S130 to S132 are the same as those shown in FIG. 8. If a step S144 discriminates the completion of charging of the flash unit, there are executed functions of the steps S107–S111 and S115 shown in FIG. 5, then a step S145 executes a discrimination similar to that in the step S112, and, if M=0, a step S146 starts the self-timer. A step S140 executes a discrimination similar to that in the step S107, and, if the flag DF is not "1", the sequence proceeds to a step S143 to execute the functions of the steps S134 and S135 in FIG. 8. A step S141 discriminates whether the time counting of the self-timer is completed, and, if not complete, the sequence returns to the step 8132, or, if complete, the sequence proceeds to a step S142 for executing an operation the same as in the step S134 in. FIG. 8. In this manner the shutter release is prohibited if the charging of the flash unit is not completed when the time counting of the self-timer is completed.

In the following there will be explained a third embodiment of the present invention, with reference to flow charts shown in FIGS. 10A and 10B, in which the display unit 14 indicating the state of the self-timer is correlated with the charging circuit 120.

The flow chart is started by the closing of the first-stroke switch SW1, and a step S1 executes light metering. Subsequent steps S2, S3, S4, S5 and S23 are respectively same as the steps S100, S102, S105, S103 and S101 shown in FIG. 5. A step S6 discriminates whether the flash mode is selected. A step S7 causes the charging circuit 120 to initiate the charging operation, and a step S8 executes a discrimination similar to that in the step S107 in FIG. 5. A step S9 discriminates whether the switch SW2 is closed, and, if closed, the sequence proceeds to a step S11, or, if open, a step S10 discriminates whether the first-stroke switch SW1 is closed.

The step S11 sets the time $T_{10}$ in the self-timer 110 and starts the time counting operation and a step S12 lights the display 14. The period $T_{10}$ is selected for example as 7 seconds. A step S12 discriminates whether the flash mode is selected, and, if not, the sequence proceeds to a step S15. If the flash mode is selected, a step S14 discriminates whether the charging operation is completed. If the discrimination of the step S14 is affirmative, the sequence proceeds to a step S15. If it is negative, the sequence remains in the step S14 until an affirmative discrimination is obtained, and then proceeds to the step S15. The step S15 discriminates the lapse of 7 seconds after the activation of the display unit 14 in the step S12, and, if the result is affirmative, the sequence proceeds to a step S16. If the result is negative, the sequence remains in the step S15 until an affirmative result is obtained, and then proceeds to the step S16.

A step S17 flashes the display unit 14, and sets a time. $T_{20}$ (for example 3 seconds) in the self-timer. A step S18 discriminates the lapse of 3 seconds after the start of flashing, and the sequence proceeds to a step S19 if the result is affirmative. If the result is negative, the sequence remains in the step S18 and proceeds to the step S19 when the affirmative result is obtained. The step S19 turns off the display unit 14. Steps S20 and S21 are the same as the steps S111 and S112 in FIG. 5.

On the other hand, if a negative result is obtained in the step S2, a step S23 sets the normal photographing mode, and a step S24 discriminates whether the flash mode is selected as in the steps S6 and S7. Steps S25 and S26 discriminate the state of the switches SW1, 8W2, as in the steps S8 and S9. A step S27 discriminates whether the flash mode is selected, and, if not, the sequence proceeds to a step S20 for effecting the photographing operation. If the flash mode is selected, a step S28 discriminates whether the charging operation is completed. The sequence proceeds to the step S20 if it is complete. If it is not complete, a step S29 prohibits the exposure and the sequence is terminated.

In the above-explained sequence, if the sell-timer mode and the flash mode are simultaneously selected, after the start of time counting in the step S11, the step S14 discriminates the state of charging, and, after the completion of charging, the step S15 discriminates the lapse of 7 seconds. Therefore, if the charging is not yet complete even after the lapse of 7 seconds, the time is accordingly extended until the completion of charging. Also in such case the display unit 14 flashes for 3 seconds after the completion of charging, and the photographing operation is conducted thereafter.

Figure 10B:
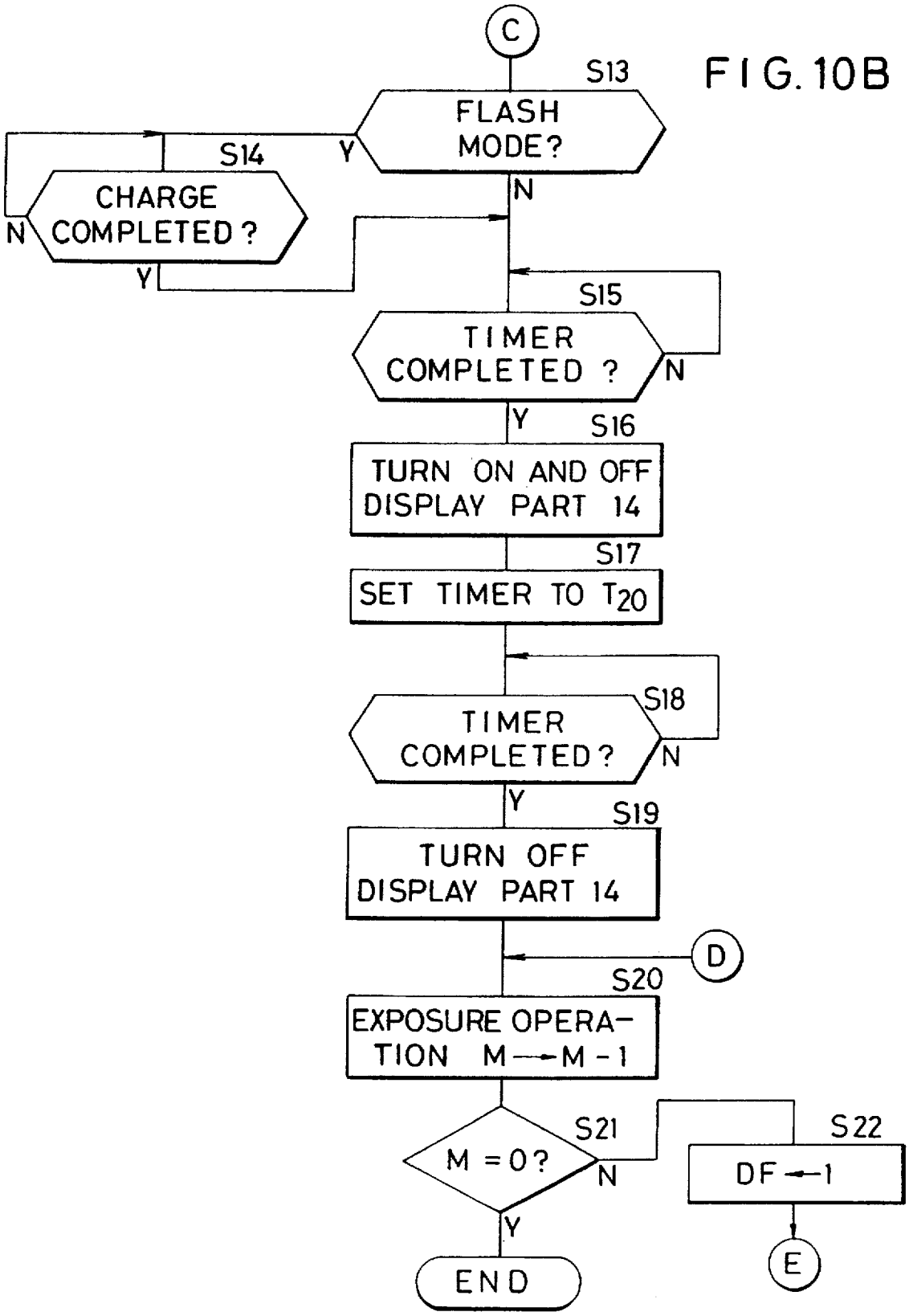
Figure 11:
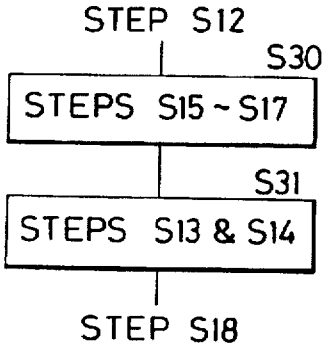
FIGS. 11, 12A, 12B, 12C, 12D, 12E and 13 are flow charts showing the function of an improvement of the third embodiment of the present invention.

It is also possible to extend the flashing period of the display unit 14 as shown in FIG. 11. After the start of time counting in the step S11 and the activation of the display unit 14 in the step S12, a step S30 corresponding to the steps S15–S17 in FIG. 10B discriminates the lapse of the period $T_{10}$, flashes the display unit 14, sets the time $T_{20}$ in the self-timer and starts the time counting. Then a step S31, corresponding to the steps S13 and S14 in FIG. 10B, discriminates whether the flash mode is selected and whether the charging is completed. Thus the step S18 discriminates the lapse of time $T_{20}$ after the completion of charging. The function after the affirmative discrimination in the step S18 is the same as that in FIG. 10B. In this manner the time of activation is maintained at $T_{10}$ as in the normal state, but the flashing period is extended.

It is also possible to discriminate the completion of charging after the lighting display for 7 seconds and the flashing display for 3 seconds, and, if the charging is not complete, to extend the flashing period until the completion of charging.

In the foregoing explanation the shutter is released simultaneously with the completion of charging, but the shutter release may be somewhat delayed from the completion of charging. For example, it is possible to discriminate the completion of charging after the lighting display for 7 seconds and the flashing display for 3 seconds as explained before, then extend the flashing display for a predetermined period if the charging is not complete, again discriminate the completion of charging at the end of said predetermined period, and repeat the extention of the flashing display for the predetermined period if the charging is still incomplete. In such case, if the completion of charging is detected in the course of flashing display of the display unit 14, the shutter is released when the display unit 14 is turned off after the flashing display is completed. In this manner the shutter release is delayed somewhat from the completion of charging.

Figure 12A:
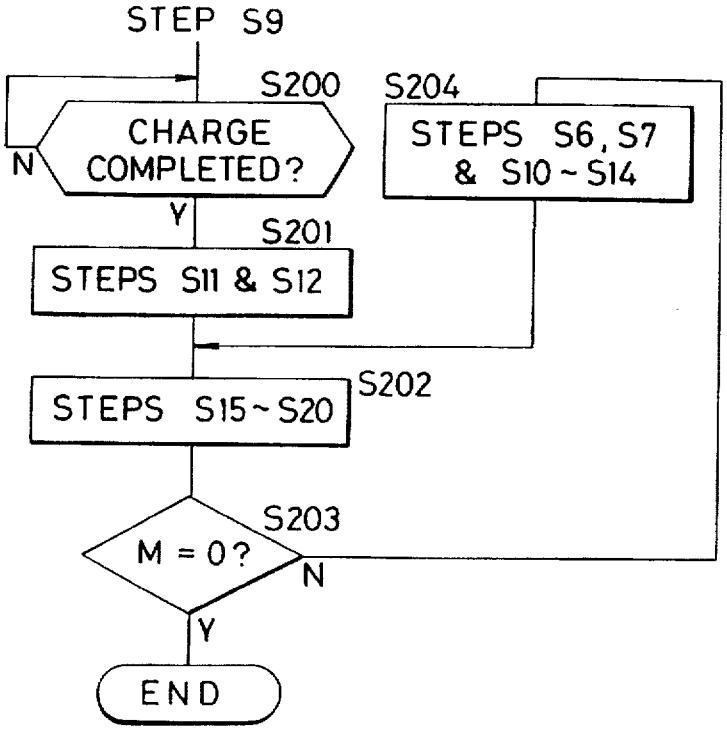
Figure 12B:
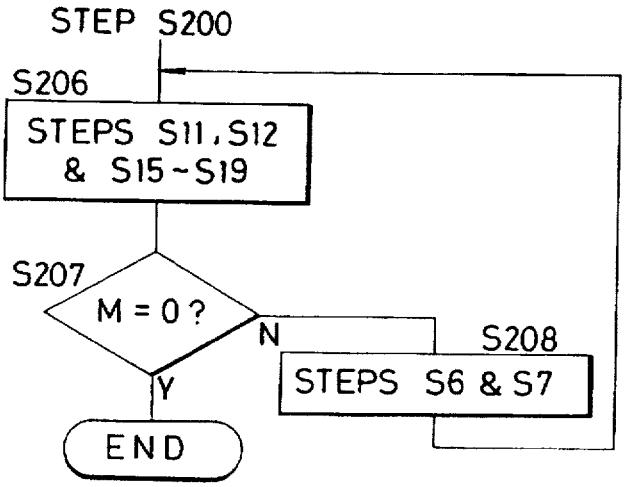
Figure 12C:
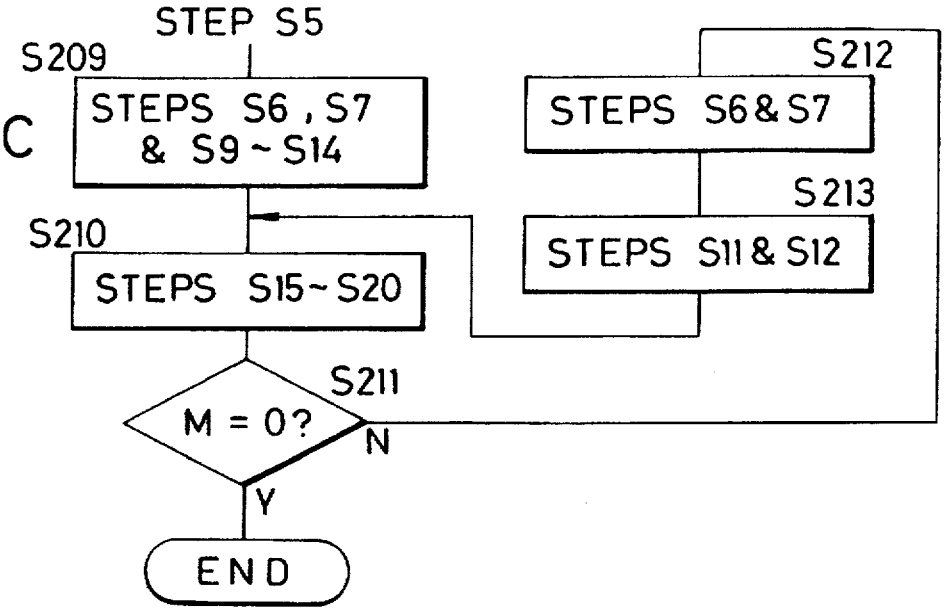
Figure 12D:
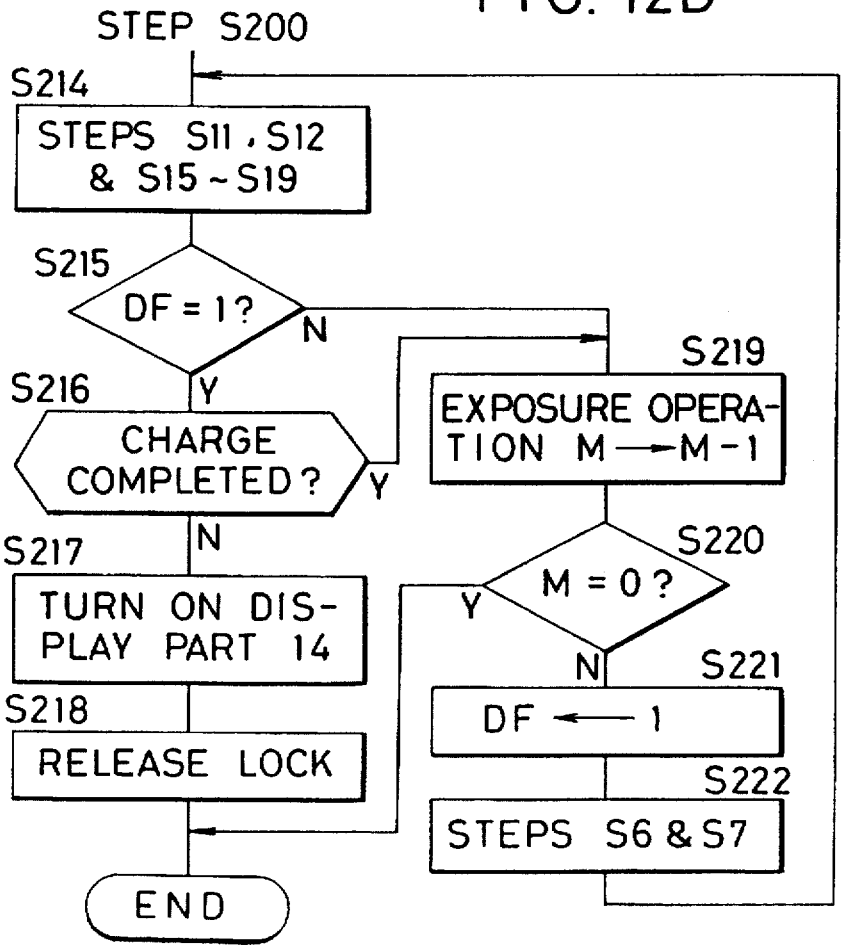
Figure 12E:
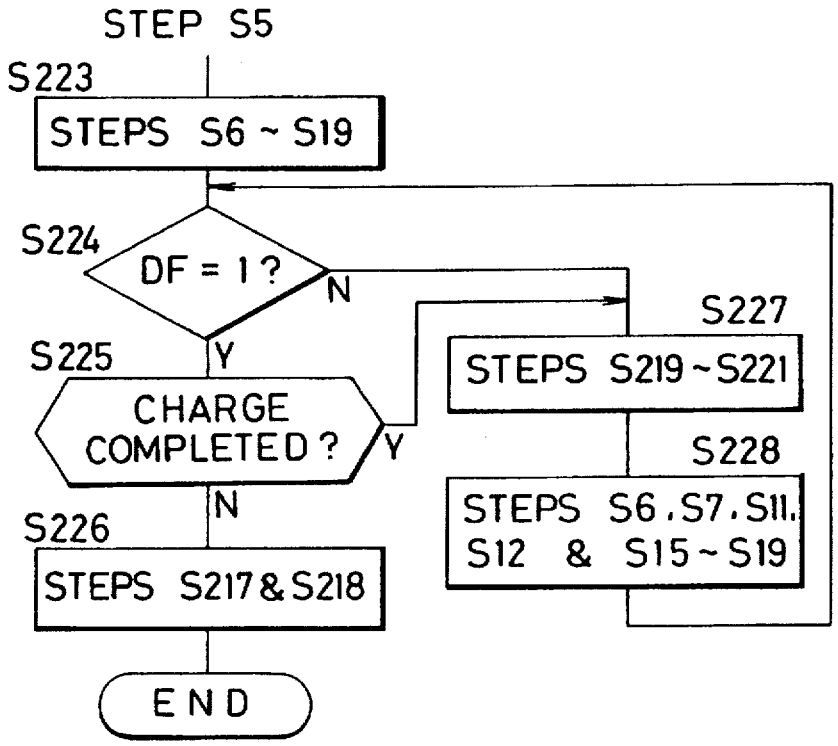

In the foregoing explanation the charging operation is conducted parallel to the time counting operation for two frames, but it is also possible, as shown in FIG. 12A, to start the time counting for the first frame after a charge completion signal is obtained, then to effect the charging and the time counting in a parallel manner for the second frame, and extend the time counting and corresponding information until the charging is completed, if it is incomplete at the end of time counting. It is also possible, as shown in FIG. 12B or 12C, to effect the charging and the time counting in a parallel for the second frame, and to release the shutter after a predetermined time is measured, regardless of whether the charging is complete or not. It is furthermore possible, as shown in FIG. 12D or 12E, to prohibit the shutter release if the charge completion signal is not obtained at the end of time counting for the second frame. These structures ensure the shutter release for the first frame and provides a higher probability of shutter release for the second frame as the time counting and the charging are conducted in a parallel manner.

Figure 13:
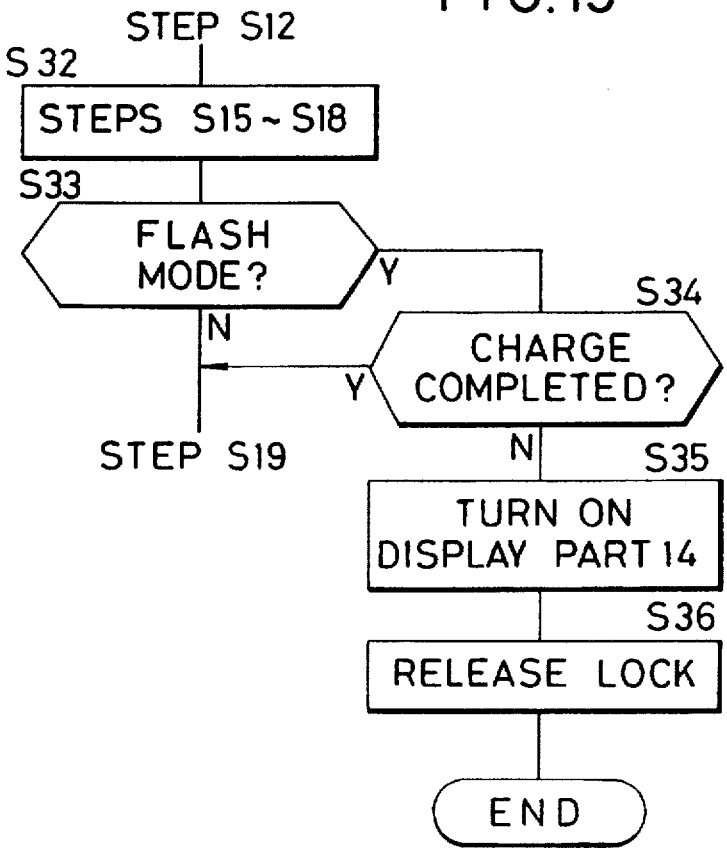

FIG. 13 shows an improvement on the third embodiment of the present invention.

Figure 10A:
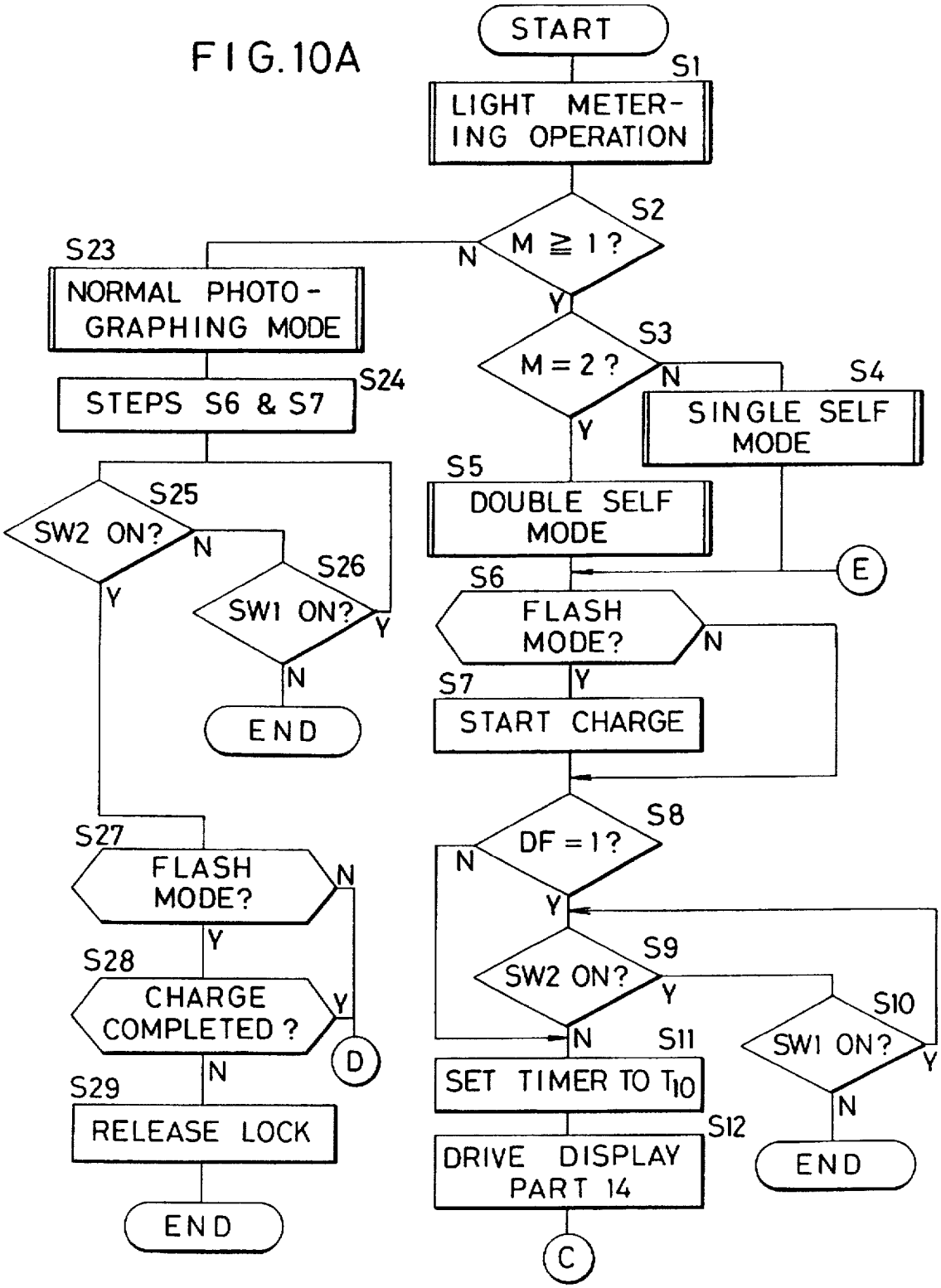
FIG. 10A and 10B are flow charts showing the function of a third embodiment of the present invention.

The sequence of FIG. 13 is the same as that shown in FIG. 10A up to the step S12. A step S32 discriminate the lapse of 7 seconds after the start of time counting, sets a time in the self-timer and starts the time counting operation in the same manner as the steps SIS to S18 in FIG. 10B. Upon discrimination of the lapse of 3 seconds after the start of flashing display, a step S33 discriminates whether the flash mode is selected, and, if not, the sequence proceeds to a step S19. If the flash mode is identified, a step S34 discriminates the completion of charging, based on the charge completion signal. If the result of discrimination in the step S34 is affirmative, the sequence proceeds to a step S19. If the result is negative, a step S35 turns on the display unit 14 again, and a step S36 prohibits the shutter release and terminates the sequence.

In the above-explained sequence, after the start of charging, the display unit 14 is turned on for 7 seconds and then flashes for 3 seconds. If the charging is not yet complete, the shutter release button is locked and the display unit 14 is turned on again to indicate the prohibition of shutter releasing operation. Consequently, the person to be photographed can confirm that the photographing operation has not been conducted.

It is also possible to conduct the photographing operation regardless of the completion of charging after the flashing display for 3 seconds, by deleting the steps S33 to S36 shown in FIG. 13.

In the foregoing explanation the locked state of the shutter release button is indicated by turning on the display unit 14 again, but the same purpose can be achieved for example, after the flashing display for 3 seconds, by increasing the frequency of flashing or varying the duty ratio thereof.

In the cameras of the foregoing embodiments, the time counting is started by the depression of the shutter release button 4 after the actuation of the self-timer button 12, but the time counting may be started by the actuation of the self-timer button 12 alone. Also the time counting and the display of the display unit 14 are simultaneously started with the closing of the second-stroke switch SW2, but there may be a slight difference in time between the closing of switch SW2 and the start of time counting or between the start of time counting and the start of display. For example, it is possible to start the time counting one second after the closing of the switch SW2, and to start the display of the display unit 14 one second thereafter. Also if the charge completion signal is detected in the program, it is possible to detect this signal by the interruption port of the microcomputer 100 and to start an interruption procedure in response to such detection.

Also in the foregoing explanation, the display or flashing display of the display unit 14 is extended if the charging is not completed within a predetermined period, but it is also possible to conduct the display or flashing display for the predetermined period only, and to provide another display during the extended time, for example by increasing the frequency of flashing or varying the duty ratio of flashing. Also such information may be given, instead of by visual display, by the combination of two different sounds, or by a combination of visual display and sound.

What is claimed is:

1. A camera having a first photographing mode in which only a single exposure operation is performed and a second photographing mode in which a plurality of exposure operations are performed continuously, said camera comprising:

self-timer means having a first state in which only a single exposure operation is performed that is delayed by an interval determined by said self-timer means with respect to manipulation of an exposure operation initiating member and having a second state in which a plurality of exposure operations are performed, including a first photographing operation that is delayed by an interval determined by said self-timer means with respect to manipulation of said member and subsequent exposure operations each of which is delayed by an interval determined by said self-timer means with respect to the preceding exposure operation;

first display means;

second display means; and control means that activates only the first of said first and second display means when said self-timer means is in said first state, that activates only the second of said first and second display means when said camera is in said second photographing mode, and that activates both of said first and second display means when said self-timer means is in said second state.

2. A camera according to claim 1, wherein said first and second display means are adjacent parts of a display unit.

3. A camera according to claim 2, wherein said camera has a housing with a predetermined plane on which said display unit is disposed.

4. A camera according to claim 3, wherein said manipulatable member is disposed on said predetermined plane.

5. A camera according to claim 2, wherein said display unit is a liquid crystal display unit.

*6. A camera having a first photographing mode in which only a single exposure operation is performed and a second photographing mode in which a plurality of exposure operations are performed continuously, said camera comprising:*

*a self-timer device having a first state in which only a single exposure operation is performed that is delayed by an interval with respect to manipulation of an exposure operation initiating member and having a second state in which a plurality of exposure operations are performed, including a first exposure operation that is delayed by an interval with respect to manipulation of said member and subsequent exposure operations each of which is delayed by an interval with respect to the preceding exposure operation;*

*a display device which indicates that the self-timer is in an operable state by indicating at least one of a plurality of display marks; and*

*a control device that controls said display device, that indicates one of said plurality of display marks when said self-timer device is in said first state, and that indicates a plurality of display marks corresponding to the number of times of exposure operations when said self-timer device is in said second state.*

*7. A camera having a first photographing mode in which only a single exposure operation is performed and a second photographing mode in which a plurality of exposure operations are performed continuously, said camera comprising:*

*a self-timer device having a first state in which only a single exposure operation is performed that is delayed by an interval with respect to manipulation of an exposure operation initiating member and having a second state in which a plurality of exposure operations are performed, including a first exposure operation that is delayed by an interval with respect to manipulation of said member and subsequent exposure operations each of which is delayed by an interval with respect to the preceding exposure operation;*

*a display device having a plurality of display marks to be displayed to indicate an operable state of the self-timer; and*

*a control device so controlling the display device as to display one of the display marks when said self-timer device is in said first state and to change the number of the display marks displayed in correspondence with the number of times of exposure operations when said self-timer device is in said second state.*

* * * * *